June 28, 1949.　　　　H. B. PUTNAM　　　　2,474,593
MULTIPOINT SPOT WELDING MECHANISM
Filed Sept. 18, 1947
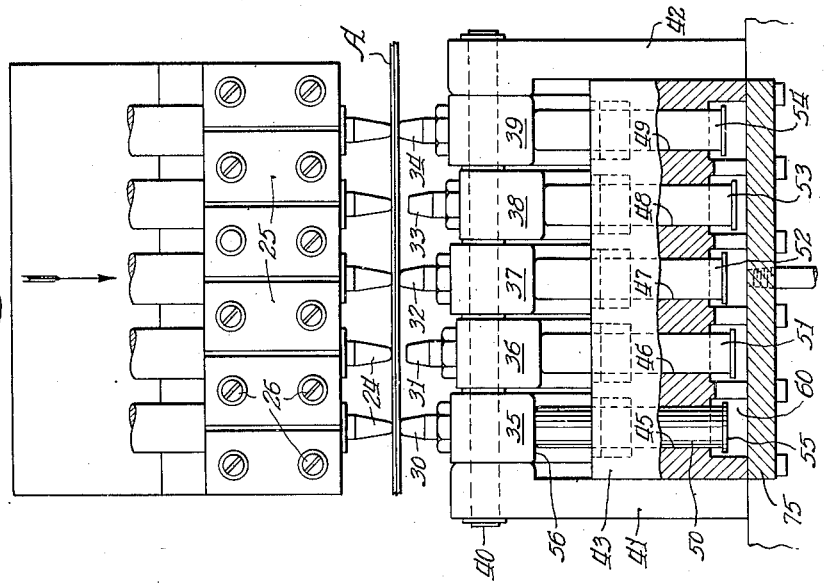
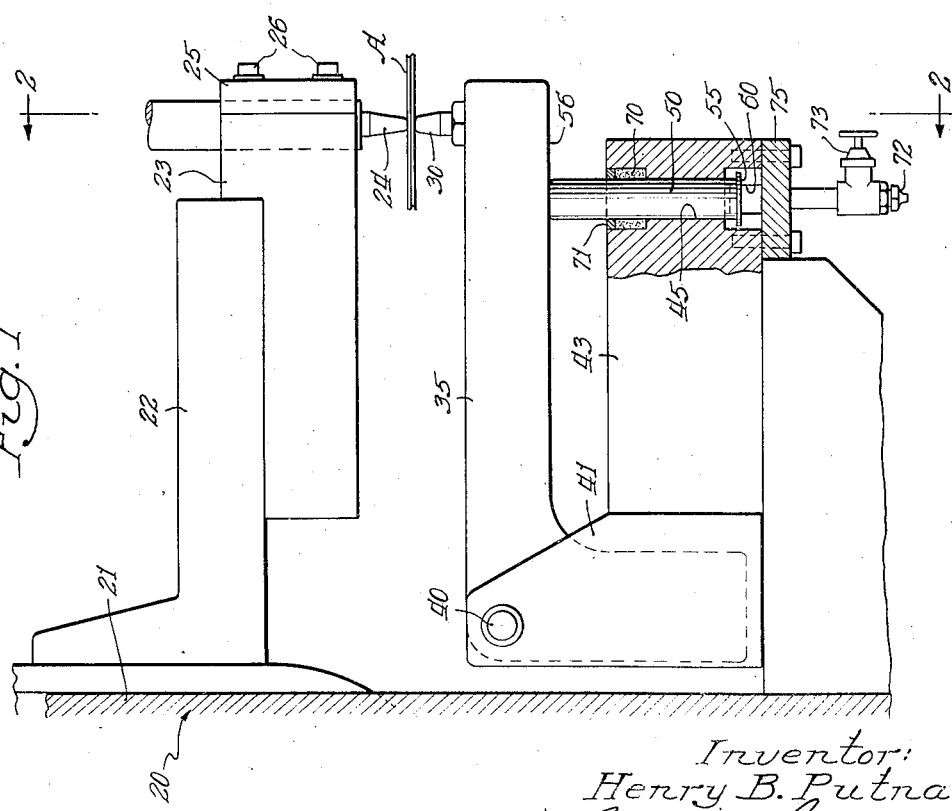
Inventor:
Henry B. Putnam Patented June 28, 1949

2,474,593

UNITED STATES PATENT OFFICE 2,474,593

MULTIPOINT SPOT WELDING MECHANISM

Henry B. Putnam, Muskegon Heights, Mich., assignor to Borg-Warner Corporation, Chicago, Ill., a corporation of Illinois Application September 18, 1947, Serial No. 774,726

8 Claims. (Cl. 219—4)

This invention relates generally to multi-point spot welding mechanisms and is particularly concerned with such mechanisms characterized by the provision of means to facilitate equal pressure on all points or electrodes, at the time the weld occurs.

Heretofore, in multi-point spot welding mechanisms, the tips had a tendency to wear and become out of adjustment, thereby a resultant unequal weld occurred because of the unequal pressure on the tips. From a practical aspect, it has been found that the top row of tips cause no trouble and can be held in a straight line; however, the bottom row of tips tend to become unequal, thereby causing a poor weld.

Accordingly, an object and accomplishment of the invention is to provide a multi-point spot welder incorporating a mechanism of such character as to provide automatic pressure equalizing at all welding electrodes at the time of weld.

The invention seeks, as a further object and accomplishment, to provide a multi-point spot welding mechanism as contemplated herein and characterized by an arrangement of parts to more advantageously and satisfactorily perform the function required of it and adapted to provide a compact unit which will successfully combine the factors of structural simplicity and durability, and yet be economical to manufacture.

Another object and accomplishment of the invention is to improve the construction of multi-point spot welding mechanisms as herein contemplated with respect to efficiency of operation; and to this end, an important feature of the invention is to provide a self-adjusting multi-point spot welder employing principles whereby the top row of electrodes is held in a stationary position, but the lower row of electrodes is provided with pneumatic means adaptable to provide equalizing pressure to said lower electrodes individually, thereby causing the necessary pressure contact between the respective upper and lower electrodes at the time of weld.

A further object of the invention is to provide a multi-point spot welding mechanism incorporating a viscous liquid chamber in which a zero pressure is provided, unless the welding tips are in contact with opposite tips and pressure is applied to the ram of such dies.

Another feature of the invention is to provide a multi-point spot welding mechanism employing principles whereby exertion of the force applied by the ram will apply pressure to the welding electrodes, the force being transmitted to a piston, thereby applying pressure to, for example, grease in a grease chamber, and as pressure equalizes instantly, equal pressure is applied to all welding electrodes, thereby eliminating unequal pressure to one or more electrodes as found in prior art structures now being employed.

Additional objects, features, and advantages of the invention disclosed herein will be apparent to persons skilled in the art after the construction and operation are understood from the withindescription.

It is preferred to accomplish the various objects of this invention and to practice the same in substantially the manner hereinafter fully described and, as more particularly pointed out in the appended claims, reference being had to the accompanying drawing, which forms a part of this specification, wherein:

Fig. 1 is a side elevational view of a multi-point spot welding mechanism embodying the features of this invention and having portions thereof shown in section to more clearly illustrate the construction thereof; and Fig. 2 is a front elevational view of the multi-point spot welding mechanism depicted in Fig. 1 and being taken substantially on the plane of the line 2—2 in Fig. 1.

The drawing is to be understood as being more or less of a schematic character for the purpose of illustrating and disclosing a typical or preferred form of the improvements contemplated herein, and in the drawing like reference characters identify the same parts in the several views.

In the exemplary embodiment of the invention depicted in Figs. 1 and 2, I have illustrated one form of multi-point spot welding mechanism, designated in its entirety by the numeral 20 and comprising in general a conventional support frame 21 adaptable to carry for movement in a vertical plane an upper horizontally forwardly projecting arm 22 which is adaptable to carry an upper platen 23. Operatively and adjustably carried by said platen 23 are a plurality of upper electrodes such as at 24. Such electrodes are normally carried by the upper platen and may be removed or inserted in operative position by removal or replacement, respectively, of the clamp bars 25 which are held in position by securing means such as, for example, bolts 26.

The lower electrodes 30, 31, 32, 33, and 34 are individually carried by arms 35, 36, 37, 38, and 39 as shown, each of which are carried pivotally by a suitable pivot pin 40 which is carried by bracket members 41 and 42, thereby facilitating individual pivotal action of such arms in a substantially vertical plane. The bracket members 41 and 42 are suitably carried by the support frame 21.

Disposed between the bracket members 41 and 42 I have provided a piston housing 43 such as, for example, a copper casting suitably formed by any approved practice to define a substantially rectangular shape and provided with through apertures 45, 46, 47, 48 and 49 each adaptable to receive a suitable piston 50, 51, 52, 53, and 54, respectively. Each of the pistons are provided with a collar as at 55 and the upper end portions thereof being adaptable to be in constant contact with a lower surface 56 of each arm as at 35.

The copper casting 43 is provided at its lower portion thereof with a chamber 60 for confining a viscous liquid such as, for example, grease in common communication with the pistons so that the generation of pressure between pistons upon the engagement of the work piece A disposed between the electrodes will be communicated to each piston uniformly and with identical values. In other words, when the work piece A is engaged between the electrodes the downward pressure acts on each piston to cause the generation of pressure which is communicated uniformly and identically to each other piston, thus causing the respective associated lower electrodes to engage the underside of the work piece A with identical pressures.

In order to provide a grease seal in the upper portions of the copper casting member 43, I have provided a suitable packing 70 surrounding each piston and said packing being retained in position by a suitable ring member 71, thereby preventing any grease from leaking from the grease chamber upwardly along the piston.

Suitable grease may be inserted into the grease chamber through a conventional grease fitting 72 after the valve 73 is in open position. After the grease chamber is filled the valve 73 is closed to prevent any leakage through the grease fitting 72.

Whenever it may be desirable to empty the grease chamber a bottom plate 75 may be removed and thereby expose the grease chamber for easy cleaning thereof.

The operation of the device is as follows: Exertion of the force applied by the ram upon the platen 22 will force the upper electrodes downwardly into contact with, for example, two flat steel plate members A which it is desired to have welded, and into contact with the lower electrodes. As can be seen in Fig. 2 the lower electrodes are in different vertical positions relative to each other. In order to provide an equal pressure between all the electrodes, the force applied by the ram is transmitted to the pistons, for example, 50, 52, and 54, which are shown in Fig. 2 as being higher in elevation than pistons 51 and 53, thereby forcing the pistons 50, 52, and 54 downwardly which will cause pressure to be exerted upon the grease in the grease chamber which, by virtue of the pressure exerted upon pistons 51 and 53, will tend to force the lower electrodes 31 and 33, which are shown for purposes of illustration as being lower in elevation, upwardly into contact with the steel plates A, thereby providing an equal pressure to all the welding electrodes. It is notable that the pressure equalizes instantly and that equal pressure is applied to all welding electrodes, thereby eliminating unequal pressure to one or more electrodes as is found in prior art devices now employed. It is notable that in this construction, automatic equalized pressure is effected so quickly that for practical purposes the pressure at the several points may be regarded as substantially continuous.

The path of pressure is as follows: When the pressure is first applied to the ram, the upper electrodes exert pressure on the steel plates A and the pressure is then applied to the lower electrodes coming in contact with the steel plates A, thereupon transmitting the pressure to each piston associated with such electrodes which action will transmit the pressure to the grease chamber which causes the grease to exert pressure on all pistons equally. The packing 70 being provided for the purpose of keeping the grease retained in the copper casting member 43, thereby permitting a very high pressure to be applied in the grease chamber at the time of weld.

For purposes of illustration I have shown a battery of five electrodes; however, it is to be understood that any number of such electrodes may be advantageously employed, the selected member being dependent upon the number of welds desired.

The welding mechanism contemplated herein may be advantageously employed in mass production manufacturing methods where multi-welds in one operation is desirable.

From the foregoing disclosure it can be observed that I have provided a multi-point welding mechanism which efficiently fulfills the objects thereof as hereinbefore set forth and provides numerous advantages which may be summarized as follows:

1. Structurally simple, efficient and durable;
2. Economical to manufacture and readily adaptable to mass production manufacturing principles; and
3. The provision of a multi-point spot welder incorporating a mechanism of such character as to provide automatic pressure equalizing at all welding electrodes at the time of weld.

While I have illustrated a preferred embodiment of my invention, many modifications may be made without departing from the spirit of the invention, and I do not wish to be limited to the precise details of construction set forth, but wish to avail myself of all changes within the scope of the appended claims.

I claim:

1. A multi-point spot welding mechanism comprising a support frame having means adaptable to carry an upper platen for movement in a vertical plane, a plurality of upper electrodes operatively and adjustably carried by said platen, a plurality of lower electrodes each operatively carried by an arm individually and pivotally associated with said support frame, and hydraulic means including a viscous liquid and pistons operatively associated with said lower electrodes and adaptable to provide equalizing pressure to said lower electrodes individually, thereby causing the necessary pressure contact between the respective upper and lower electrodes at the time of weld.

2. A multi-point spot welding mechanism comprising a support frame having means adaptable to carry an upper platen for movement in a vertical plane, a plurality of upper electrodes operatively and adjustably carried by said platen, a plurality of lower electrodes each operatively carried by a member pivotally associated with said support frame, and means incorporating a viscous liquid operatively associated with each lower electrode and adaptable to equalize relative pressure between said electrodes, said means comprising a plurality of pistons each respectively operatively associated with an individual lower electrode, and a grease chamber associated in common communication with said pistons, said grease chamber having a statical pressure unless the welding tips are in contact with opposed tips and pressure is applied.

3. A multi-point spot welding mechanism comprising a support frame having means adaptable to carry an upper platen for movement in a vertical plane, a plurality of upper electrodes operatively and adjustably carried by said platen, a plurality of lower electrodes each operatively carried by a member pivotally associated with said support frame, and means incorporating a viscous liquid and pistons operatively associated with said lower electrodes to provide equalizing pressure to said lower electrodes individually, thereby causing the necessary pressure contact between the respective upper and lower electrodes at the time of weld.

4. In a multi-point spot welding mechanism, a plurality of upper electrodes, support means for said upper electrodes adaptable to movement in a vertical plane, a plurality of lower electrodes opposed to said upper electrodes, and individual support means for said lower electrodes adaptable for individual pivotal movement in a vertical plane, in combination with means operatively associated with each lower electrode and adaptable to equalize relative pressure between said electrodes, said means comprising a plurality of pistons, each respectively and operatively associated with an individual lower electrode, and a grease chamber respectively associated with each of such pistons and in common communication each with the other, said grease chamber having a statical pressure unless the welding tips are in contact with opposed tips and pressure is applied, whereby exertion of the force applied by the upper electrodes upon the lower electrodes upon contact thereof will transmit said force to the pistons operatively associated with said lower electrodes, thereby applying pressure to the grease in said grease chamber, whereby equal pressure will be applied to all welding electrodes.

5. In a multi-point spot welding mechanism having a support frame having means adaptable to carry for movement in a vertical plane an upper platen, the combination of a plurality of upper electrodes operatively and adjustably carried by said platen, of a plurality of lower electrodes each operatively carried by an arm individually and pivotally associated with said support frame, and of hydraulic means including a viscous liquid and pistons operatively associated with said lower electrodes and adaptable to provide equalizing pressure to said lower electrodes individually, thereby causing the necessary pressure contact between the respective upper and lower electrodes at the time of weld.

6. In a multi-point spot welding mechanism having a support frame having means adaptable to carry an upper platen for movement in a vertical plane, a plurality of upper electrodes operatively and adjustably carried by said platen, and a plurality of lower electrodes each operatively carried by a member pivotally associated with said support frame, in combination with hydraulic means operatively associated with each lower electrode and adaptable to equalize relative pressure between said electrodes, said hydraulic means comprising a plurality of pistons each respectively operatively associated with an individual lower electrode, and a grease chamber respectively associated with a piston and in open communication each with the other, said grease chamber having a statical pressure unless the welding tips are in contact with opposed tips and pressure is applied.

7. In combination, a support frame, an upper platen, a plurality of upper electrodes operatively and adjustably carried by said platen, a plurality of lower electrodes each operatively carried by a member pivotally associated with said support frame, and means incorporating a viscous liquid operatively associated with each pivotal member to equalize relative pressure between said electrodes, said means comprising a plurality of pistons each respectively operatively associated with an individual pivotal member, and a chamber to retain the viscous liquid associated in common communication with said pistons, said chamber having a statical pressure unless the welding tips are in contact with opposed tips and pressure is applied.

8. In a multi-point spot welding mechanism comprising a plurality of upper electrodes, support means for said upper electrodes adaptable to movement in a vertical plane, and a plurality of lower electrodes opposed to said upper electrodes, the combination of individual support means for said lower electrodes adaptable for individual pivotal movement in a vertical plane, means operatively associated with each support means for said lower electrodes to equalize relative pressure between said electrodes, said means comprising a plurality of pistons, each respectively and operatively associated with an individual pivotal support means, and a chamber containing a viscous liquid respectively associated with each of such pistons and in common communication each with the other, said chamber having a statical pressure unless the welding tips are in contact with opposed tips and pressure is applied, whereby exertion of the force applied by the upper electrodes upon the lower electrodes upon contact thereof will transmit said force to the pistons operatively associated with the pivotal support means, thereby applying pressure to the viscous liquid in said chamber, whereby equal pressure will be applied to all welding electrodes.

HENRY B. PUTNAM.

REFERENCES CITED

The following references are of record in the file of this patent:

UNITED STATES PATENTS

| Number | Name | Date |
| --- | --- | --- |
| 1,918,226 | Gilbert | July 11, 1933 |
| 1,996,901 | Burns | Apr. 9, 1935 |